United States Patent [19]

Daeyaert

[11] Patent Number: 4,632,402
[45] Date of Patent: Dec. 30, 1986

[54] SHAFT SEAL WITH BOTH HYDROSTATIC AND HYDRODYNAMIC PRESSURE PARTS

[75] Inventor: Guido J. E. Daeyaert, Mortsel, Belgium

[73] Assignee: Atlas Copco Aktiebolag, Nacka, Sweden

[21] Appl. No.: 669,324

[22] Filed: Nov. 7, 1984

[30] Foreign Application Priority Data

Dec. 1, 1983 [SE] Sweden .................................. 8306626

[51] Int. Cl.[4] .......................... F16J 15/34; F16J 15/48
[52] U.S. Cl. ........................................ 277/15; 277/18; 277/24; 277/27; 277/59; 277/81 R
[58] Field of Search ...................... 277/27, 15, 17, 18, 277/59, 24, 81 R

[56] References Cited

U.S. PATENT DOCUMENTS

| | | | |
|---|---|---|---|
| 2,284,465 | 5/1942 | Wood | 277/15 X |
| 3,005,518 | 10/1961 | Jassniker | 277/15 X |
| 3,926,442 | 12/1975 | Müler | 277/27 |
| 3,949,996 | 4/1976 | Inove et al. | 277/27 |
| 4,328,973 | 5/1982 | Delbridge | 277/27 |
| 4,329,127 | 5/1982 | Tschirky et al. | 277/27 |
| 4,482,159 | 11/1984 | Ishitani et al. | 277/27 |

*Primary Examiner*—Robert S. Ward
*Attorney, Agent, or Firm*—Eric Y. Munson

[57] ABSTRACT

A shaft seal for a gas pumping device comprising a mechanical seal (5,6) and a labyrinth seal in form of a sliding bearing (4). A chamber (7) between the mechanical seal and the sliding bearing is fed with lubricant for the bearing at a pressure being higher than the gas pressure on the other side of the mechanical seal so that there is no leakage of gas past the mechanical seal.

1 Claim, 1 Drawing Figure

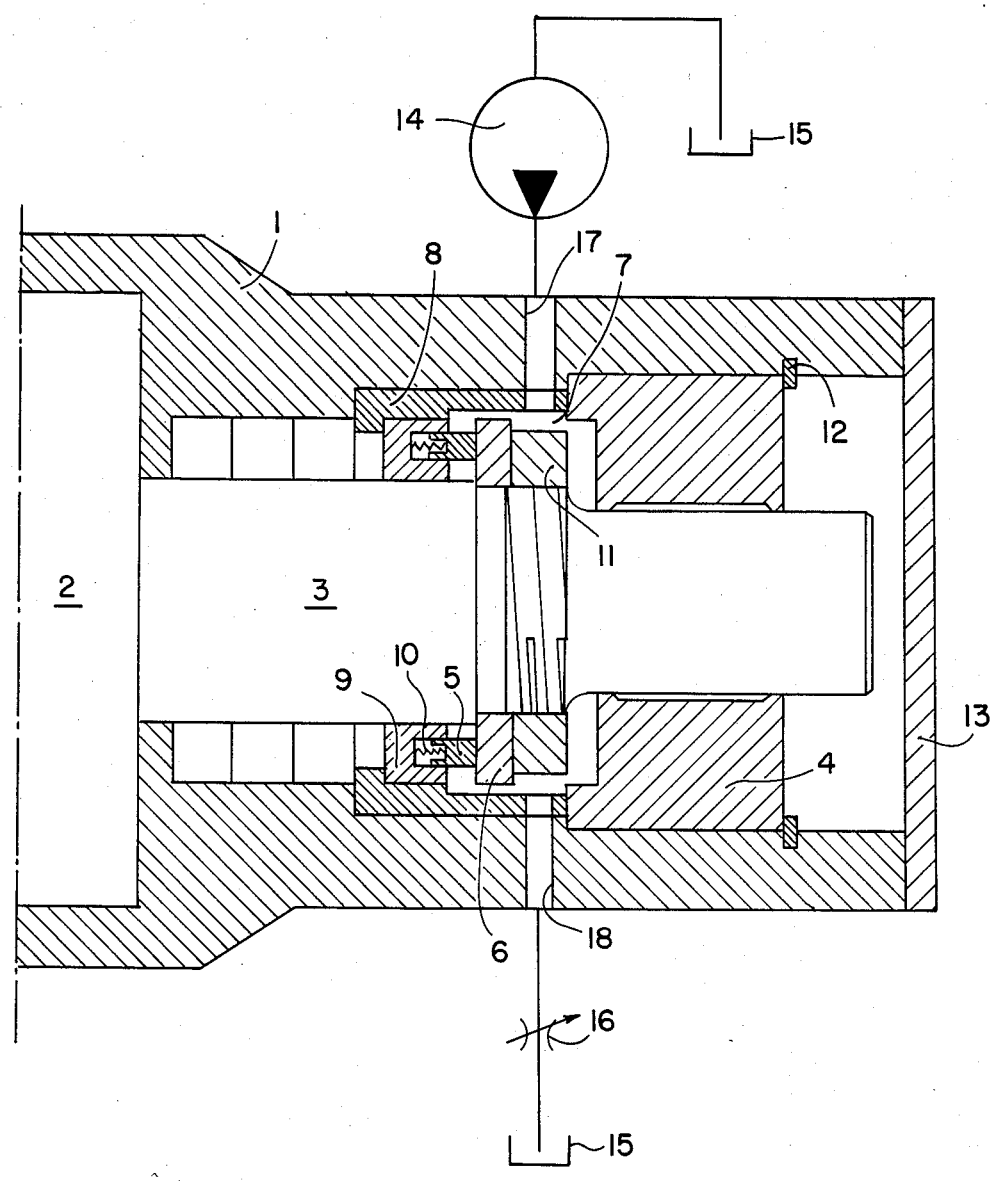

SHAFT SEAL WITH BOTH HYDROSTATIC AND HYDRODYNAMIC PRESSURE PARTS

BACKGROUND OF THE INVENTION

The present invention relates to a shaft seal for a gas pumping device.

The gas to be pumped by a gas pumping device is sometimes either expensive or dangerous. In such a case there is a requirement that the pump chamber is completely sealed off from the surrounding atmosphere. According to prior art this has been obtained through arranging two seals between the pump chamber and the slider bearing in which the shaft end of the rotatable pumping element is journalled. The chamber between the two seals is then supplied with liquid whose pressure is somewhat higher than the gas pressure so that no leakage of gas occurs.

SUMMARY OF THE INVENTION

The present invention aims at doing away with one of the prior art seals. This is obtained by using the slider bearing as a labyrinth seal. The chamber between the remaining mechanical seal and the sliding bearing is pressurized by the lubricant for the sliding bearing as claimed in the appended claim. The advantages obtained with the invention are shorter shaft ends, making the whole mounting stiffer, reduced friction losses and lower price. Four seals less are used for a screw compressor stage.

BRIEF DESCRIPTION OF THE DRAWINGS

An embodiment of the invention is described below with reference to the accompanying drawing which shows the mounting of a shaft end of a screw compressor.

DETAILED DESCRIPTION OF AN EMBODIMENT OF THE INVENTION

The device shown in the drawing comprises a housing 1 which defines a pump chamber in which a pumping element 2 is rotatable to pump a gas from a not shown inlet to a not shown outlet. The shown device is a screw compressor of which only one of the screws is visible. Each screw is provided with two shaft ends 3 of which only one is shown. Shaft end 3 is journalled in a slider bearing 4 which is locked in position by a lock ring 12. The housing is provided with a sleeve 8 in which a ring 9 being provided with another ring 5 is arranged. A further ring 6 is fixed on shaft end 3 by means of a nut 11. Ring 5 is pressed against ring 6 by springs 10. Rings 5,6 together form a mechanical seal between the pump chamber and the exterior of the device. Housing 1 is covered by a cover plate 13. A chamber 7 situated between slider bearing 4 and the mechanical seal 5,6 is fed with lubricant for the slider bearing by a pump 14 through channel 17. Lubricant flows from chamber 7 through bearing 4 and through channel 18 and restriction 16 to tank 15. The lubricant flowing through bearing 4 is also drained to tank 15. The variable restriction 16 is used to adjust the pressure level in chamber 7. This pressure must be higher than the gas pressure on the other side of the mechanical seal 5,6 to ensure that no gas leaks out from the pump chamber. The shaft seal will thus comprise a mechanical seal 5,6 and a labyrinth seal formed by a slider bearing 4.

I claim:

1. In a gas pumping apparatus in which gas is pumped from a gas inlet end to a gas outlet end in a pump chamber defined within a stationary housing, by pumping means carried by a rotary shaft having its end rotatably supported in a slider bearing, a combined hydrostatic and hydrodynamic pressure seal for said shaft for preventing leakage of gas from said pump chamber, characterized by:
   (a) mechanical sealing means carried by said stationary housing forming a hydrostatic resilient seal between said stationary housing and said pump chamber;
   (b) a lubricant chamber defined between said mechanical sealing means and said slider bearing for supplying lubricant fluid to said slider bearing and to said mechanical sealing means; and
   (c) means for supplying lubricant fluid into said lubricant chamber under pressure sufficient to counteract the pressure exerted by the gas on said seal.

* * * * *